US012759719B2

(12) United States Patent
Orchard

(10) Patent No.: US 12,759,719 B2

(45) Date of Patent: Oct. 13, 2026

(54) AIRCRAFT FUEL CELL AIR SUPPLY ANTI CONTAMINATION SYSTEM

(71) Applicant: Zero Emissions Aerospace Limited, Bristol (GB)

(72) Inventor: Matthew Noel Orchard, Bristol (GB)

(73) Assignee: Zero Emissions Aerospace Limited, Bristol (GB)

( * ) Notice: Subject to any disclaimer, the term of this patent is extended or adjusted under 35 U.S.C. 154(b) by 9 days.

(21) Appl. No.: 18/334,474

(22) Filed: Jun. 14, 2023

(65) Prior Publication Data

US 2023/0417183 A1 Dec. 28, 2023

(30) Foreign Application Priority Data

Jun. 15, 2022 (EP) .................................... 22179253

(51) Int. Cl.

| | |
|---|---|
| ***B64D 33/02*** | (2006.01) |
| ***B64D 45/00*** | (2006.01) |
| ***F02C 7/052*** | (2006.01) |
| ***H01M 8/04111*** | (2016.01) |
| ***H01M 8/0444*** | (2016.01) |
| ***H01M 8/04746*** | (2016.01) |
| ***H01M 8/04791*** | (2016.01) |
| ***H01M 8/04858*** | (2016.01) |

(52) U.S. Cl.

CPC ............. *B64D 33/02* (2013.01); *B64D 45/00* (2013.01); *F02C 7/052* (2013.01); *H01M 8/04111* (2013.01); *H01M 8/0444* (2013.01); *H01M 8/04753* (2013.01); *H01M 8/04791* (2013.01); *H01M 8/04932* (2013.01); *B64D 2033/022* (2013.01); *H01M 2250/20* (2013.01)

(58) Field of Classification Search

CPC . B64D 33/02; B64D 2033/0246; F02C 7/052; F02C 7/055; F02C 7/057; F05D 2260/607; F02M 35/10262

See application file for complete search history.

(56) References Cited

U.S. PATENT DOCUMENTS 3,534,548 A * 10/1970 Connors ................ F02C 7/042 55/306

4,047,911 A * 9/1977 Krojer ....................... F02C 7/05 55/306

(Continued)

FOREIGN PATENT DOCUMENTS

EP 3889395 A1 * 10/2021 ............ B64D 45/00

JP 2004239774 A 8/2004

WO 2009064288 A1 5/2009

*Primary Examiner* — Justin D Seabe

(74) *Attorney, Agent, or Firm* — Smartpat PLC

(57) ABSTRACT

The invention defines a combined system of sensor(s), control logic, air intake and contaminant deflector for a fuel cell system mounted on an aircraft, which will detect contamination in the free air flow surrounding the aircraft and if excessive contamination is detected will activate the contaminant deflector to protect the fuel cell system from contamination, damage and power loss. The system ensures constant speed of the aircraft by adjusting the power of the fuel cells to compensate any change in aircraft drag and adjusts the speed of any connected compressors to maintain and achieve necessary changes in power and compensation for any air pressure losses the system creates.

20 Claims, 6 Drawing Sheets

(56) References Cited

U.S. PATENT DOCUMENTS

| | | | | |
|---|---|---|---|---|
| 4,250,703 | A * | 2/1981 | Norris | B64D 33/02 55/306 |
| 4,346,860 | A * | 8/1982 | Tedstone | B64D 33/02 55/306 |
| 4,836,473 | A * | 6/1989 | Aulehla | B64C 23/06 244/130 |
| 5,697,394 | A * | 12/1997 | Smith | B64D 33/02 137/15.1 |
| 6,901,737 | B2 | 6/2005 | Schnoor | |
| 6,991,280 | B2 | 1/2006 | McKnight et al. | |
| 7,069,893 | B2 | 7/2006 | Cusumano et al. | |
| 7,624,944 | B2 | 12/2009 | Parikh et al. | |
| 7,802,433 | B2 * | 9/2010 | Higgins | F02C 7/042 60/39.092 |
| 7,861,968 | B2 | 1/2011 | Parikh et al. | |
| 7,871,038 | B2 | 1/2011 | Space et al. | |
| 8,439,297 | B2 | 5/2013 | Colaprisco et al. | |
| 8,973,867 | B2 | 3/2015 | Eichholz et al. | |
| 9,151,253 | B2 | 10/2015 | Bunnell et al. | |
| 10,054,050 | B2 * | 8/2018 | Labrecque | F02C 7/05 |
| 10,196,148 | B1 * | 2/2019 | Schmid | B64D 13/00 |
| 11,008,939 | B2 * | 5/2021 | Snyder | F02C 7/057 |
| 11,945,593 | B2 * | 4/2024 | Kierbel | H01M 8/04111 |
| 2003/0075643 | A1 * | 4/2003 | Dunn | B64D 27/24 244/59 |
| 2006/0040144 | A1 | 2/2006 | Shimizu et al. | |
| 2008/0099630 | A1 | 5/2008 | Parikh et al. | |
| 2014/0295747 | A1 | 10/2014 | Schmid et al. | |
| 2016/0288912 | A1 | 10/2016 | Richardson et al. | |
| 2017/0141419 | A1 * | 5/2017 | Wu | A62C 3/08 |
| 2018/0298817 | A1 | 10/2018 | Kalya et al. | |
| 2019/0023404 | A1 | 1/2019 | Schmid et al. | |
| 2020/0044265 | A1 * | 2/2020 | Reum | H01M 8/04798 |
| 2020/0049082 | A1 | 2/2020 | Hjelm et al. | |
| 2020/0180774 | A1 * | 6/2020 | Rainville | B60L 58/00 |
| 2021/0403172 | A1 | 12/2021 | Fayard et al. | |

* cited by examiner

AIRCRAFT FUEL CELL AIR SUPPLY ANTI CONTAMINATION SYSTEM

CROSS-REFERENCE TO RELATED APPLICATION

This application claims the benefit of European Patent Application EP 22179253.4 filed on Jun. 14, 2022, the contents of which are incorporated by reference in their entireties.

TECHNICAL FIELD

This disclosure relates to a system for air supply contamination protection for fuel cells for aircraft and similar vehicles, where rain, hail, foreign objects or other contamination ingress would cause damage or uncontrolled loss of power to a fuel cell used to power the vehicle.

BACKGROUND

As new environmentally friendly ways to power vehicles like aircraft are being developed, the operating environment risks that prior technologies had to be protected against remain the same and must be addressed. These new technologies may also create new challenges to operate in this environment effectively due to the sensitivity of the technology to the environment, whether it is driven by altitude, weather or other factors. This is particularly relevant in the demanding environment that aircraft operate in.

The types of operating environment risks that an aircraft propulsion systems face can range from large debris in the air such as dust and sand, impacts from hailstones, to the risk of ingesting high volumes of rain. High volume rain ingress is notably known to cause flame out and large-scale damage to gas turbines, and rain albeit naturally occurring can be considered as contamination in this case. All of these contamination types may be problematic for fuel cells. These environmental risks often require specific design solutions, operating techniques and certification demonstrations to prove that the vehicle propulsion system will be able to safely operate in these conditions as such environmental effects can reasonably be expected to be encountered in real life.

SUMMARY

The introduction of new propulsion systems using fuel cells must therefore have suitable means to prevent contamination, such as dust, sand, hail and rain, impacting their operation. Fuel Cell systems on an aircraft typically require a compressor or turbo-compressor to compress the air, which like a gas turbine can be subject to damage from rain, hail and debris in the air, and the loss of or degradation to the compressor will compromise air flow through the cathode of the fuel cell and consequentially compromise the power available to the aircraft. Further the fuel cell itself will not operate effectively if it becomes flooded by a high amount of ingested water, or if debris block the cathode air channels necessary for the oxygen in the air to come in contact with the fuel cell membrane and enable electricity to be generated. Debris and flooding may even result in permanent physical damage to the fuel cell requiring replacement or degrading its performance during and after the event.

For these reasons the fuel cell air supply system requires a protection system for when the aircraft enters an air flow that is excessively contaminated and would degrade the fuel cell performance. This contamination protection system should detect and activate to protect the fuel cell system, including all of the balance of plant such as any attached compressor or turbo-compressor, whilst also continuing to deliver enough air that is sufficiently decontaminated into the fuel cell to enable it to continue to provide the necessary power for the aircraft.

To provide such protection against the contamination of debris, rain and hail in static and some mobile applications, the state of the art would be to provide air intakes with many curves or a large settling space or 'breathing box' to cause the air flow to be decelerated and changed in direction so that large contaminants drop out of the air. This would typically be combined with very intensive filters. The problem with using this approach to a vehicle like an aircraft is these devices cause significant pressure losses in the air flow creating a lot of inefficiency as these pressure losses have to be recovered prior to the air being supplied to the fuel cells. The second issues is they take up a lot of volume or space on the vehicle, which will ultimately add to the size and drag of the aircraft, further reducing the efficiency of the aircraft.

The innovation comprises a contamination detection sensor or sensors, a logic of control and operation and a contamination deflector either fitted forward of an air intake connected to a fuel cell of an aircraft, or in alternative embodiments a contamination deflector fitted within the air intake connected to a fuel cell of the aircraft. The operation of the contamination prevention system is periodic and as required at any point of the aircraft operational phases, based on the detection of contamination in the surrounding air flow. This may be during ground phases, such as taxiing, take-off and landing, but also during flight phases.

Thus, in a first aspect the present invention provides an anti-contamination system configured to protect an air intake channel of an aircraft from airborne contaminants in an air flow, the system including: a sensor configured to detect contaminants in the air flow; a contaminant deflector deployable from a retracted position to a deployed position in which it disrupts the air flow to thereby deflect contaminants away from or out of the air intake channel; and a controller programmed to move the contaminant deflector to the deployed position in response to detection by the sensor of contaminants in the air flow.

The invention may protect any type of air intake for a fuel cell on an aircraft, which could range from a scoop design or ram air intake projecting into the slipstream around the vehicle, or it can be applied to a flush mounted inlet such as a NACA inlet or duct.

The air intake channel may comprise an inlet at an external surface of the aircraft. It may be configured to direct an air flow from the inlet to a compressor configured to provide compressed air to a fuel cell or other propulsion system.

The contaminant deflector is preferably positioned either upstream of an inlet of the air intake channel or within the air intake channel.

In the deployed position, the contaminant deflector preferably disrupts the air flow by directing it outwardly away from an external surface of the aircraft to thereby carry airborne contaminants away from an inlet of the air intake channel. In the retracted position, the contaminant deflector preferably causes no or negligible disruption to the air flow.

The contaminant deflector may comprise an impingement surface which, in use, the air flow impinges against in the deployed position. Preferably, the impingement surface is arranged at an angle to an external surface of the aircraft in the deployed position to thereby urge the air flow away from the external surface. In the retracted position the impingement surface may be generally aligned with, or contiguous with, the external surface.

In some embodiments, when the contaminant deflector is in the retracted position in use, the air flow generally follows a flow direction, and the impingement surface is arranged at an angle to the flow direction in the deployed position.

The sensor(s) can detect contamination in the air flow, for example contaminants such as water, ice and debris in the air flow. A suitable sensor may include a sensor configured to detect contaminants using infrared radiation. For example, the sensor may include an infrared emitter and an infrared receiver. Infrared radiation emitted by the emitter may be reflected by airborne contaminants and received by the receiver, to thereby detect the presence of contaminant.

The sensor will be mounted in a position on the aircraft that gives suitable contamination detection potential in the free air flow around the vehicle, especially with regards to contamination in the flow around the air intake. The sensor may or may not be in close proximity to the contamination deflector and air intake. If the sensor is in close proximity to the air intake and contamination deflector it must be sited in a position so that the deflector does not negatively affect its operation. The contamination deflector should not for instance block the air flow from passing over the sensor, nor should the deflectors operation distort the air flow around the sensor so that the sensor becomes ineffective. The sensor(s) selected will have the necessary level of sensitivity to detect any contamination that would degrade or damage the fuel cell and balance of plant that the system is protecting, and in some embodiments there may be more than one type of sensor to detect different types of contamination or to create redundancy in the system.

The sensor(s) may be flush mounted with the external surface of the aircraft, to minimise drag, or may be mounted in a slightly projected orientation if needed to improve contamination detection potential. If more than one sensor is used on the vehicle, the sensors may be used separately to activate the anti-contamination system, or in combination with a set of voting logic to determine the condition for system activation. The individual sensor(s) may also be used for one or more deflection systems mounted on the same vehicle, as in some aircraft applications there will be more than one protection system fitted to the aircraft. In such configurations it may be chosen to activate all the systems based on one or more sensors common to all the protection devices, or it may alternatively be chosen to activate each protection system via its own unique sensor(s).

In preferred embodiments the air intake channel is for delivering air from the air flow surrounding the vehicle to a fuel cell of the aircraft via an intake air flow, and in the deployed position the contaminant deflector is configured to either: (i) disrupt the air flow to thereby deflect contaminants in the air flow away from the air intake channel; or (ii) disrupt the intake air flow to thereby deflect contaminants out of the air intake channel.

Preferably, in the deployed position the contaminant deflector projects outwardly from an external surface of the aircraft upstream of the air intake channel into an external air flow across the external surface, to thereby disrupt the external air flow and deflect contaminants in the air flow away from the air intake channel. Preferably, there is a gap between the contaminant deflector and an inlet of the air intake channel to thereby define a protected air space downstream of the contaminant deflector.

In such embodiments, to prevent excessive air contamination passing through the air intake and into the fuel cell system, the contamination sensor will trigger the activation of a deflector to a deployed position in which it projects into the air flow. This deflector in such embodiments could be a simple flap, or it may be a ramp, but its function will be to divert the contamination in the air flow sufficiently clear of the air intake so that any contaminants having a mass above a design target mass will be deflected in their flow path to the extent that they do not get sucked into the air intake by the suction coming from the compressor in the fuel cell system. There is a proportionality in the relationship between the aircraft speed, the suction coming from the compressor, the air inlet throat area, the location of the deflector and the target contamination minimum mass that will inform the height that the deflector reaches and the width of the deflector necessary, but the flight orientations of the aircraft will also have to be considered on top. For instance, the effect of pitch up or yaw on the aircraft, whether transient or stable, would cause a deviation of the oncoming air flow direction and therefore the deflector size and angle would need to be larger to accommodate these deviations.

In such arrangements in the retracted position the contaminant deflector is preferably integrated into the external surface of the aircraft. That is, an external surface of the contaminant deflector in the retracted position preferably forms a generally continuous surface with one or more surrounding external aircraft surfaces. Aerodynamic steps and gaps are preferably minimised.

When the contamination sensor is not detecting contamination, then the deflector should be retracted to a position that causes minimum drag on the aircraft, and no disturbance to the air flow entering the air intake to maximise the overall efficiency of the aircraft and propulsion system.

In alternative embodiments, the air intake channel is for delivering air from the air flow surrounding the vehicle to a fuel cell of the aircraft via an intake air flow, and in the deployed position the contaminant deflector obstructs the air intake channel to define a secondary outlet channel via which the intake air flow is diverted to a secondary outlet at external surface of the aircraft.

In such embodiments in the deployed position the contaminant deflector preferably defines a secondary intake channel having a secondary air inlet (optionally downstream of the secondary outlet), the secondary intake channel being configured to deliver a secondary intake air flow from the secondary air inlet to the fuel cell. The inlet of the air intake channel in such embodiments is typically upstream of the secondary air inlet.

The contaminant deflector may form a barrier wall between the secondary outlet channel and the secondary inlet channel in the deployed position.

Such alternative embodiments may have the contamination deflector integrated into the air intake, rather than being separate and upstream of the air intake. Such embodiments will use the same control logic and trigger from the contamination sensor. In its non-activated state when the deflection mechanism is retracted, part of it may form the internal walls of the air intake. When the contamination sensor detects excess air contamination and the contamination deflector is deployed, then an element of the intake walls may actuate to connect some of or all of the intake flow to an adjoining channel directing the contaminated air away from the compressor and fuel cells and instead will direct this air flow overboard the aircraft. The movement mechanism will concurrently open up a secondary flow path channel that using suction from the compressor draws air with low contamination from a separate area of the aircraft. This area will be in part protected by an externally projecting element of the deflector mechanism into the main air flow surrounding the aircraft to limit air contamination that can be drawn into the secondary suction path.

In such arrangements, in the retracted position the contaminant deflector preferably obstructs (i.e. closes or completely blocks) the secondary outlet channel.

The contaminant deflector may have a first portion and a second portion, wherein in the retracted position the first portion partially defines the air intake channel and the second portion partially defines an external surface of the aircraft.

In the deployed position the first portion may be contiguous with the second portion to define a continuous deflecting surface (or impingement surface).

In preferred embodiments, in the deployed position the contaminant deflector projects outwardly beyond an external surface of the aircraft. This arrangement serves to aid dispersal of airborne contaminants away from the external surface of the aircraft.

The deflector in preferred embodiments would be electrically actuated, but any type of mechanical or electrical actuation is possible. As failure of the anti-contamination system will need to be considered for safe continued flight in the case of a failure, then if there is a failure of the actuator system it should cause the contamination deflector to fail in the deployed position protecting the fuel cell from contamination. This could be achieved by having the deflector sprung loaded to be naturally in the deployed position with the actuator providing a closing force to retract the contamination deflector when in normal operation.

Thus, the contaminant deflector is preferably biased to the deployed configuration. Alternatively, the contaminant deflector may be biased to the retracted configuration.

The system may comprise an actuator controllable by the controller to: hold the contaminant deflector in the retracted position; and to release the contaminant deflector to allow it to move to the deployed position in response to detection by the sensor of contaminants in the air flow.

For embodiments where the deflector is not part of the air intake, the deflector will be positioned sufficiently upstream of the air intake, so that the air intake is not blocked by the deflector, but rather creates a protected air space between the deflector and the air intake where the suction draw of the compressor for the fuel cell can still draw air from. The size of this space will be sized by a) the potential flight attitudes or orientations of the aircraft that might redirect flow around the deflector, b) the rate of air sucked from the protected air space by the compressor, c) the throat size of the air intake that the air is drawn through, d) the minimum mass of contamination to be protected against, and e) the momentum given to that contamination by the movement of the aircraft through the air. Because the contamination, whether it is rain, or grit, or hail, will have a higher mass than the air it is travelling in a suitably sized deflector will deflect this contamination away from the air intake, but the continued suction of air by the compressor from the protected air space will cause the flow around the deflector to become angled towards the air intake, more than without the presence of the suction. Therefore, the aforementioned sizing relationships for the deflector and its deflection angle based on both the mass of the contamination to be protected against, the speed of the vehicle and the consequent air flow around the air intake and the ongoing suction levels must be used to correctly size the invention for each vehicle application.

In embodiments using an externally mounted contamination deflector to reduce the size of the external deflector, in preferred embodiments the extreme edges of the deflector will have vortex generators fitted to them. That is, the system may comprise one or more vortex generators at one or more outer edges of the contaminant deflector. The one or more vortex generators may be configured to, in use, generate vortices directed away from the air intake channel. When the contamination deflector is deployed the vortex generators have two advantages: firstly, the vortex generator will force the primary air flow moving around the deflector an additional distance corresponding to the height of the vortex generator away from the air intake it is protecting; secondly, it will also energise the air and entrain the contamination reducing the likelihood that the compressor suction will draw the contamination into the fuel cell system.

The control logic of the innovation includes managing the consequences if the system detects contamination and triggers the deployment of the contamination deflector, and how this deployment will cause a pressure drop in the air supplied to the fuel cell and consequently reduce the air pressure at the cathode of the fuel cell which may result in a drop in power from the fuel cell system. Therefore, the anti-contamination controller will be connected to the fuel cell system measurements, using data from existing sensors such as air mass flow or voltage levels, and if the system detects from these measurements that a power drop is possible it will increase the speed of the connected compressor to compensate the required air flow to the fuel cell cathodes. Further as the deployment of the anti-contamination deflectors in most embodiments will increase the drag of the aircraft, and this may result in a reduction of airspeed of the aircraft if unchecked, so the control logic will also consider this possibility and increase the overall power of the propulsion system as necessary whilst the deflectors are deployed to maintain a constant airspeed of the aircraft. When the contamination sensor detects the contaminant levels are reduced sufficiently that the contamination deflectors can be withdrawn, then the control logic will reverse the power setting and compressor speed changes to maintain the aircraft at a constant airspeed.

Thus, in some embodiments the air intake channel is for delivering air from the air flow to a compressor of a fuel cell of the aircraft, and the controller is programmed to increase a speed of the compressor in response to deployment of the contaminant deflector to the deployed position. Similarly, in such embodiments the controller may be programmed to decrease a speed of the compressor in response to deployment of the contaminant deflector to the retracted position.

In related embodiments, the air intake channel is for delivering air from the air flow surrounding the vehicle to a fuel cell of the aircraft, and the controller is programmed to increase a set power output level of the fuel cell in response to deployment of the contaminant deflector to the deployed position, optionally wherein the controller is programmed to control a speed of the compressor in response to the set power output level of the fuel cell. Similarly, in such embodiments the controller may be programmed to reduce a set power output level of the fuel cell in response to deployment of the contaminant deflector to the retracted position. The skilled person will understand that the set power output level may be also influenced by other factors, such as aircraft system effects. Thus, the controller may be programmed to control the set power output level and/or a speed of the compressor in response to other factors, in addition to the configuration of the contaminant deflector.

A second aspect of the invention provides an aircraft comprising a fuel cell, an external surface, an air intake channel in fluid communication with the external surface and the fuel cell, and an anti-contamination system according to the first aspect.

A third aspect of the invention provides a method of protecting an air intake channel of an aircraft from airborne contaminants in an air flow using an anti-contamination system according to the first aspect, the method including the step of: by the controller, responding to detection of contaminants in the air flow by the sensor by deploying the contaminant deflector to the deployed position.

A fourth aspect of the invention provides an anti-contamination system configured to protect an air intake of an aircraft from airborne contaminants in an external air flow across an external surface of the aircraft, the air intake being for delivering air from the external air flow to a fuel cell of the aircraft via an intake air flow, wherein the anti-contamination system includes: a sensor configured to detect contaminants in the external air flow; a contaminant deflector deployable from a retracted position to a deployed position in which it is configured to either: (i) disrupt the external air flow to thereby deflect contaminants in the external air flow away from the air intake; or (ii) disrupt the intake air flow to thereby deflect contaminants out of the air intake; an actuator operable to move the contaminant deflector between the retracted and deployed positions; and a controller operable to control the actuator to move the contaminant deflector to the deployed position in response to detection of contaminants in the external air flow by the sensor.

Further aspects of the invention are set out in the following numbered clauses:

1. A system of a contamination sensor(s), control logic and a contamination deflector(s) that activates when contamination of the air is detected in the air stream surrounding an aircraft to prevent or limit the amount of contamination that can enter the air intake for a fuel cell system for said aircraft in any flight or ground operation phase.
2. An air contamination sensor mounted anywhere on an aircraft that is used to detect contamination for the said purpose of activating a contamination prevention control sequence for protecting a fuel cell installed in the aircraft.
3. A control logic applied to a fuel cell system in an aircraft that adjusts the power output of the fuel cells in response to the deployment of a device intended to protect the said fuel cell system that would alter the drag and/or performance of the aircraft during any flight or ground operation phase.
4. A control logic of sequencing the movement of an air contamination deflector and the increase/decrease in speed of a compressor supplying air to a fuel cell to provide a consistent amount of air (oxygen) for the fuel cell to react.
5. A control logic for a system of a fuel cell coupled with a compressor where the compressor speed is ramped up or down in response to the deployment of a device intended to protect a fuel cell system from contamination or damage that alters the available air mass or air pressure into the fuel cell.
6. A moving air contaminant deflector mounted upstream of an air intake for a fuel cell installed on an aircraft, for use in a system described in clause 1, that can be actuated to deflect contaminants in the air sufficiently far away from a fixed air intake mounted behind it, whilst leaving an available low contaminant air space in the wake of the deflector for the fuel cell system to continuously draw low contaminant air from.
7. A sizing relationship for a system using a moving contaminant deflector and fixed air intake, which uses the principles of proportionality of the air intake size, free air flow speed, angular effect of aircraft operating attitudes, spacing between the contaminant deflector and the air intake, the air intake mass flow rate and the air intake throat area.
8. A moving air contaminant deflector mounted inside a fixed air intake of an aircraft for a fuel cell, for use in a system relating to clause 1, that opens up a secondary air channel to deflect contaminated air away from communication with the fuel cell system, whilst opening up a secondary air channel protected from contaminants for the compressor to draw low contaminant air from.
9. A deployable air contaminant deflector relating to any of the above clauses that has aerodynamic features that cause vortices to form, which are positioned so that the vortices entrain and direct contamination in the air away from an air intake.

Any of the features of the invention described herein with respect to any aspect or embodiment of the invention may be applied to any aspect of the invention, either individually or in any combination. In particular, any feature of the first aspect may be applied to either the second, third or fourth aspects.

BRIEF DESCRIPTION OF THE DRAWINGS

One or more embodiments of the invention will now be described, by way of example only, with reference to the accompanying drawings, in which.

DETAILED DESCRIPTION

Figure 1:
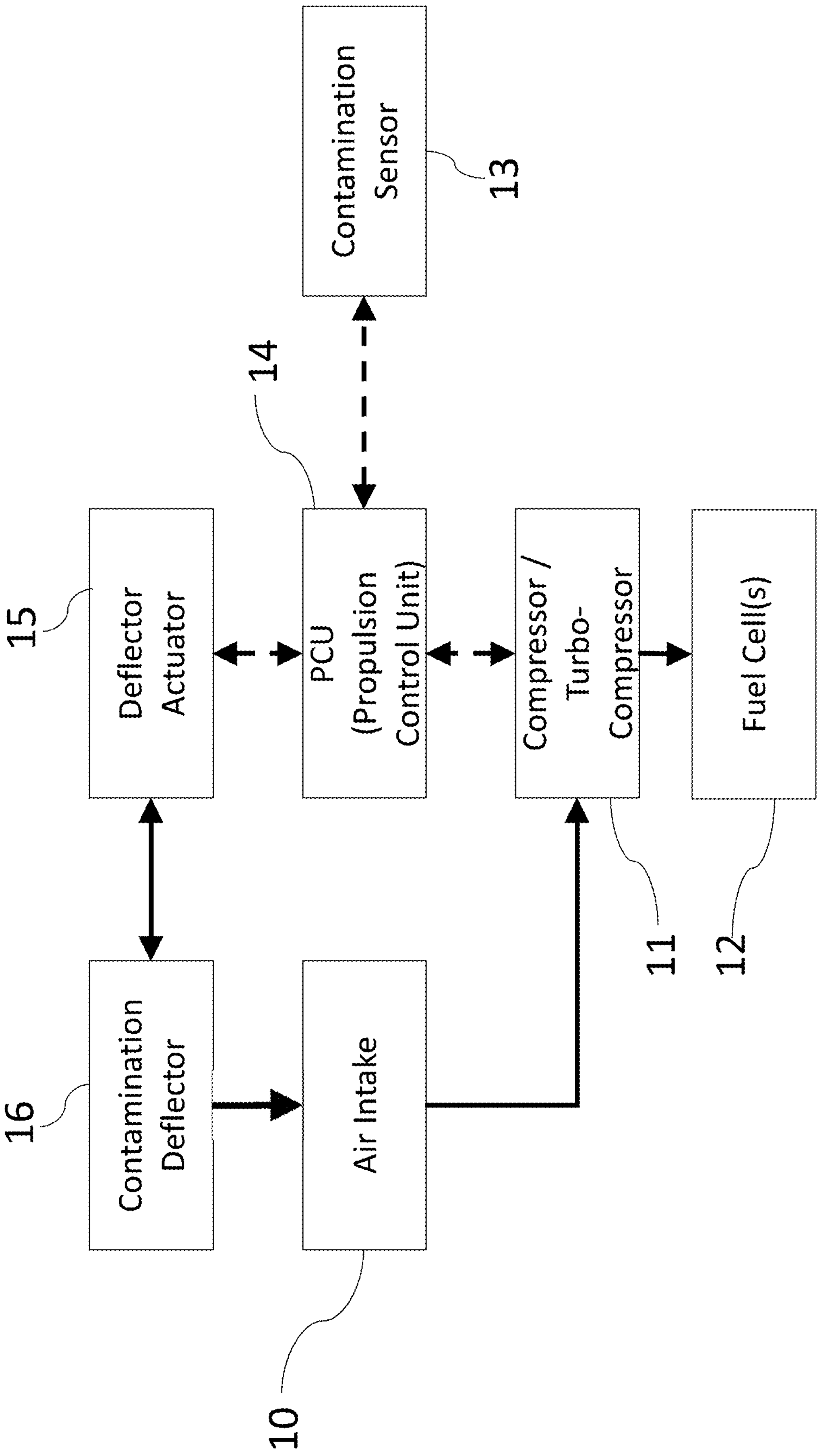
FIG. 1 illustrates a system view of an embodiment of the invention.

In general terms, FIG. 1 shows an overview of the invention, which in preferred embodiments provides an air intake 10 that connects to and supplies air to a turbo-compressor or compressor 11, which in turn supplies air to a fuel cell 12 in the aircraft. The aircraft has mounted on its exterior surface in a suitable location one or more contamination sensor(s) 13 to detect contaminants in the air flow over the exterior surface. The contamination sensor 13 could be an infrared type sensor or an equivalent device, or a combination of different sensors incorporating different sensing technologies to sense different types of contamination.

If the presence of air contaminants is detected by the contamination sensor 13 then the contamination sensor 13 will deliver a signal to the PCU (Propulsion Control Unit)

14, or similar logic controller. In response to receiving the signal, the PCU 14 will trigger an actuator 15 to release a contamination deflector 16 such that it positions itself in the air flow within or upstream of the air intake 10 to deflect the majority of contaminants in the air flow away from progressing further into the air intake and consequently from entering the compressor 11 and fuel cell 12.

When the PCU 14 is triggered by the contamination sensor 13 to actuate the contamination deflector 16 then it will also communicate to the compressor 11 to increase the speed of the compressor. This increase in speed serves to compensate for the loss of ram air and other pressure losses due to the deployment of the contamination deflector 16, which disrupts the flow in the air intake 10. This system is intended to be operable for all operation phases of the aircraft, including both flight phases and ground phases.

Figure 2:
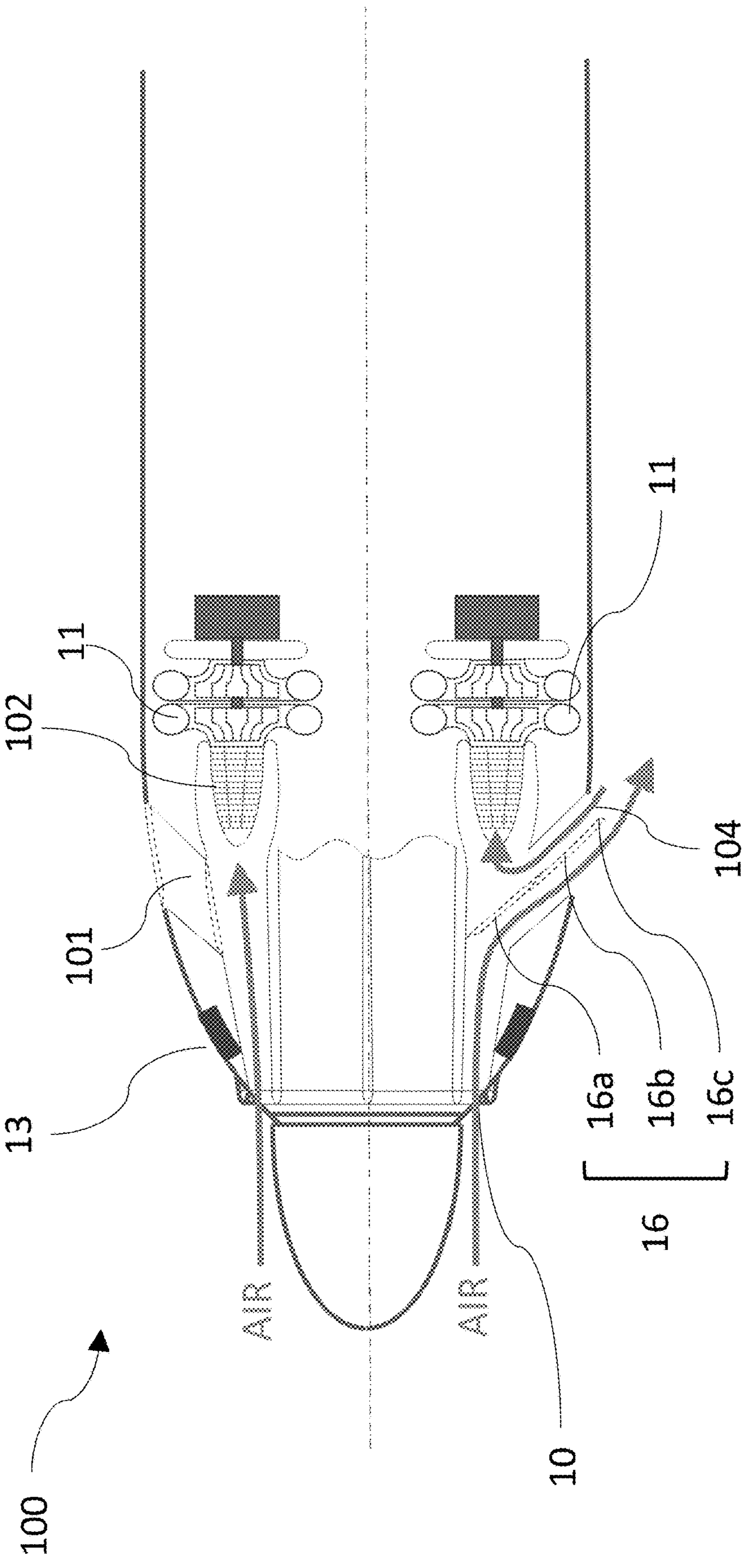
FIG. 2 illustrates an embodiment of the invention where the air contamination deflector is integrated within the air intake duct.

FIG. 2 shows an embodiment of the invention where the intake 10 has an inlet at the leading edge of a part of the aircraft 100, and the contamination deflector 16 is integrated as a sub-element of the air intake 10. In the upper part of the illustration the contamination deflector 16 is shown in its retracted position, while in the lower part of the illustration the contamination deflector 16 is shown in its deployed position. Arrows illustrate how air travels through the air intake 10 in each of the retracted position and the deployed position.

The air intake 10 provides a channel connecting the inlet with the compressor 11, and the contamination deflector 16 is mounted down-stream of the inlet and up-stream of the compressor 11. Optionally an air filter 102 may be included in the flow path between the inlet of the air intake 10 and the fuel cell(s). In the illustrated embodiment of FIG. 2 the air filter 102 is located immediately before the compressor 11.

The contamination deflector 16 in this embodiment comprises first 16*a* and second 16*b* elements. The first elements 16*a* form part of the air intake 10 internal surfaces when the deflector 16 is in the retracted position. The second elements 16*b* are independent of the air intake 10, and only interact with the flow path when the contamination deflector 16 is activated to its deployed position in which it projects into the air flow in the air intake. In preferred embodiments the second elements 16*b* form part of the external surface of the aircraft 100.

When the contamination deflector 16 mechanism is activated to its deployed position it it will connect the inlet of the air intake 10 to an adjacent air channel 101 that is otherwise not in communication with the air intake or the external air flows around the aircraft. In the deployed position the first 16*a* and second 16*b* elements form a continuous barrier to divide the adjacent air channel 101 into a secondary outlet channel and a secondary inlet channel downstream of the secondary outlet channel. Thus, air flowing from the inlet of the air intake 10 is diverted along the secondary outlet channel to a secondary outlet, so that contaminants within that air flow are diverted away from the compressor 102. Clean air is drawn into the secondary inlet channel from a secondary air inlet to the compressor 102.

A projecting part 16*c* of the contamination deflector 16 will be created by the positioning and kinematics of the second element 16*b*, such that the deflector 16 projects beyond the external surface of the aircraft into the external air flow in the deployed position. This will ensure that the contaminated air flow diverted from the air intake 10 will be projected beyond the external surface of the aircraft. This flow in combination with the projecting part 16*c* will create a low contamination air space 104 which the compressor or turbo-compressor 11 can safely draw air from with a lowered contaminant content into the secondary inlet channel.

The contamination sensor 13 is built into a separate part of the aircraft where it has the most likelihood to effectively detect the onset of a contaminated air flow and is unaffected by the operation of the contamination deflector 16. In the illustrated embodiment the contamination sensor 13 is fitted up-stream of the contamination deflector 16.

Figure 3:
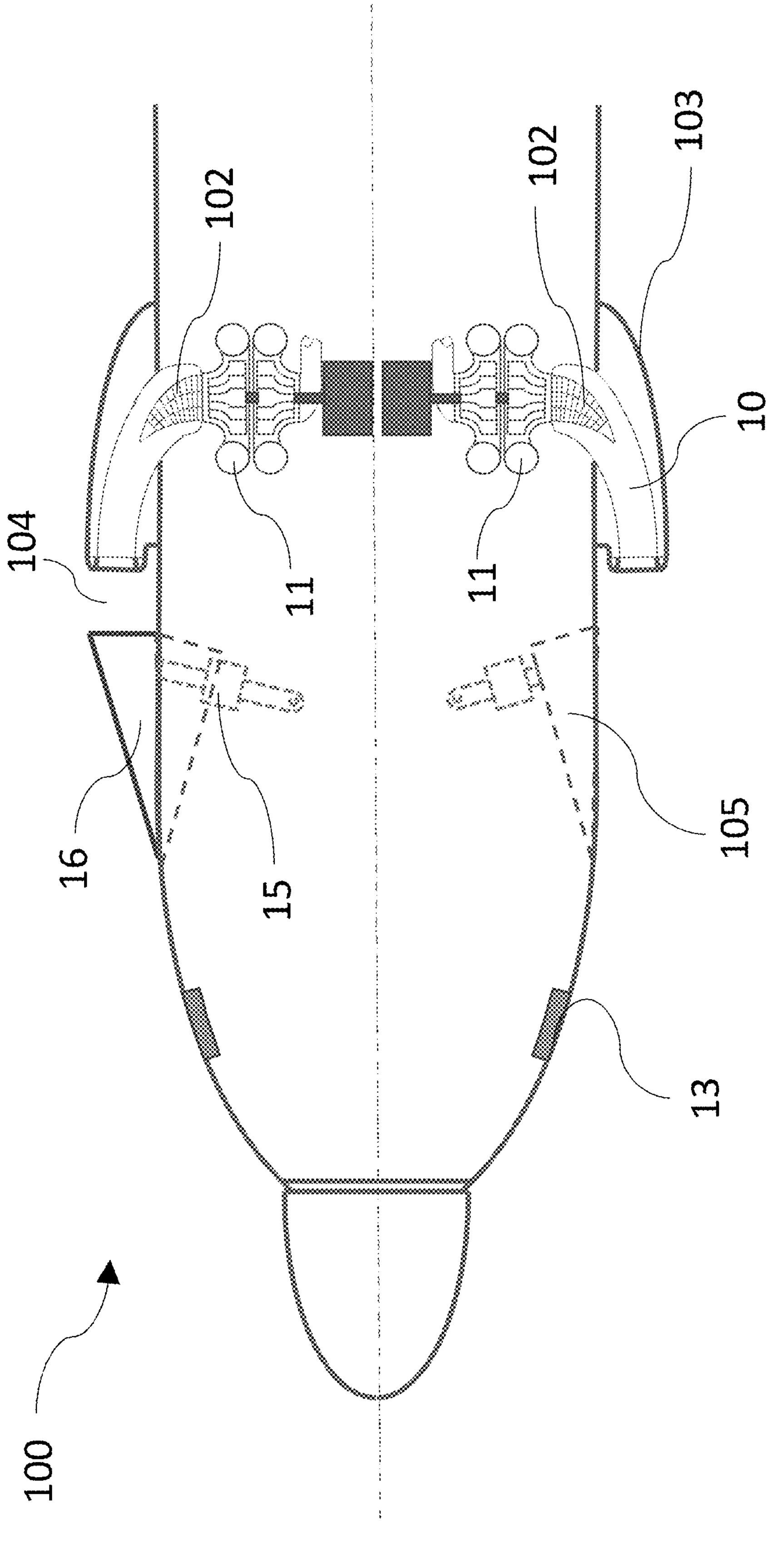
FIG. 3 illustrates an embodiment of the invention where the air contamination deflector is positioned separately and upstream of the air intake.

A preferred embodiment of the invention is shown in FIG. 3, where the contamination deflector 16 and air intake 10 are mounted on a side surface of the aircraft 100. In the upper part of the illustration the contamination deflector 16 is shown in its deployed position, while in the lower part of the illustration the contamination deflector 16 is shown in its retracted position.

In this embodiment the air intake 10 is shown in the form of a scoop that projects from the aircraft 100. Alternatively, the invention may be used in conjunction with any projecting air intake types or flush mounted air intake types such as a NACA inlet. Scoop type air intakes 10, such as that illustrated in FIG. 3, may optionally be fitted with an aerodynamic fairing 103.

The air intake 10 feeds air from an inlet to a compressor 11 and may optionally have an air filter 102 included up-stream of the propulsion system. The anti-contamination system has a contamination sensor 13 fitted onto a separate part of the aircraft where it has the most likelihood to effectively detect the onset of a contaminated air flow and is unaffected by the operation of the contamination deflector 16. In the illustrated embodiment the contamination sensor 13 is fitted up-stream of the contamination deflector 16.

Should the contamination sensor 13 detect sufficient contamination present in the air flow then, via the control logic enacted by the PCU 14, it will cause the actuator 15 to release the contamination deflector 16 from a retracted position to a deployed position where it projects into the air flow sufficiently to deflect the contaminated airflow beyond the air inlet 10, whilst accounting for the suction effects of the compressor 11. Important to the effective working of the system is the air space 104 between the contamination deflector 16 and the air intake 10 which must be sufficient that the compressor 11 has sufficient contaminant free volume to suck air from this protected space behind the contamination deflector 16 taking into account factors such as the mass of the contaminant, aircraft velocity and aircraft attitude.

FIG. 3 also illustrates the retracted position of the contamination deflector 16, in which there is an unobstructed and clean air flow into the air intake 10. Also illustrated is the retraction trough 105 in which the deflector 16 is concealed in the retracted position so that it appears integrated into the external surface of the aircraft.

Figure 4:
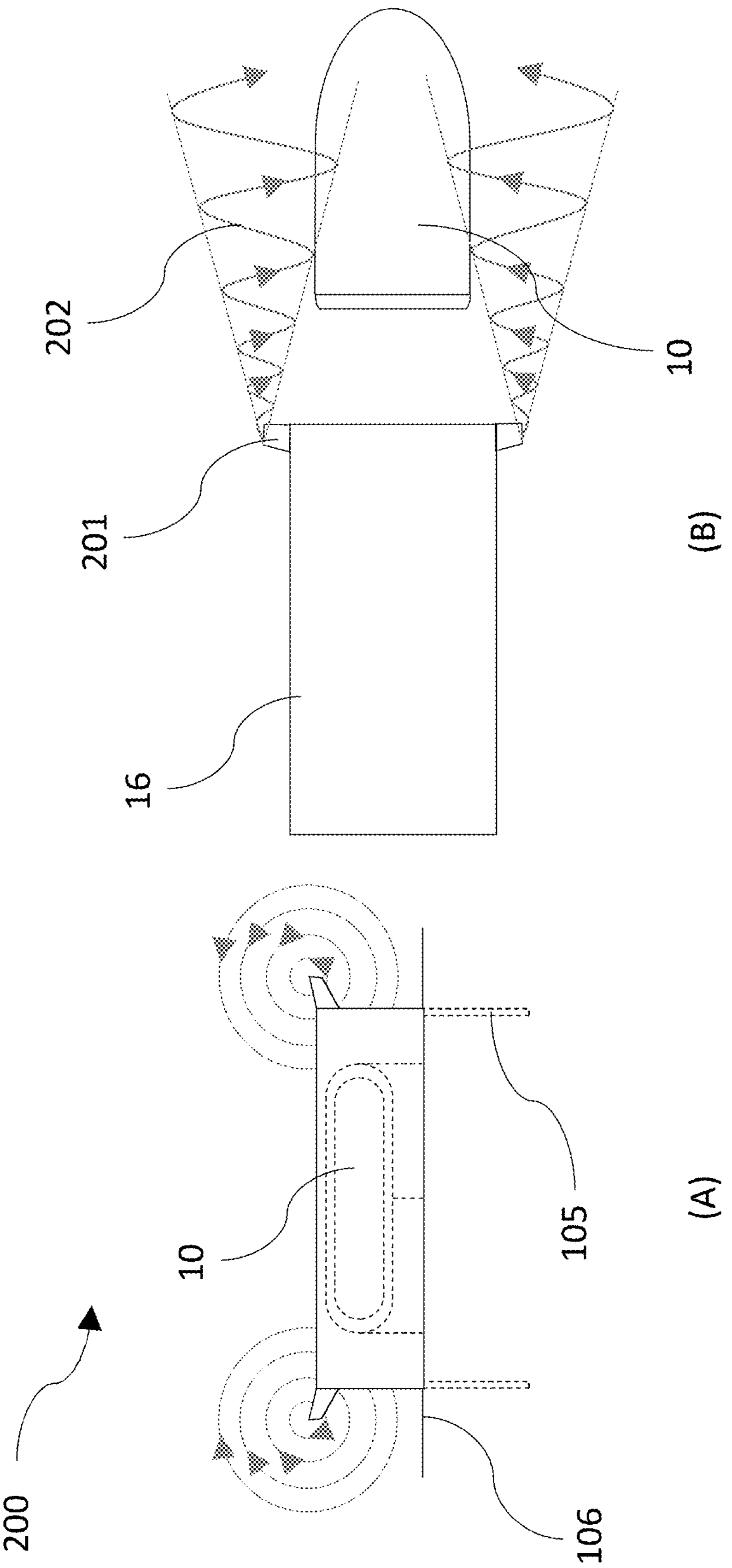
FIG. 4 illustrates an embodiment of the invention which creates favourable vortices to reduce contamination ingress.

FIG. 4 shows the deployment of a contamination deflector 16 forward of an air intake 10, where in preferred embodiments the contamination deflector 16 has additional aerodynamic features 201 such as a pair of vortex generators that, when the contamination deflector 16 is deployed into the air flow in the deployed position, cause air vortices 202 to be generated. When the contamination deflector 16 is retracted into the retraction trough 105, then these aerodynamic features 201 are also retracted flush with the surface of the aircraft 106 and do not act on the air flow external to the aircraft. When the contamination deflector 16 is deployed to the deployed position, however, the air vortices 202 generated by the aerodynamic features 201 create energy in the air flow in the form of an air vortex 202 that acts from the end of the aerodynamic features 201 and thus positions the contaminated air flow further away from the air intake 10 than the basic geometry of the contamination deflector 16. These air vortices 202 have a high energy to entrain any air contamination within them and thereby reduce the possibility that the contamination can enter the air intake 10. These air vortices 202 are so positioned that in all aircraft flight attitudes, including pitch up and yaw, that the air vortices will not impinge on the throat of the air intake 10. The air vortices therefore prevent contamination from being communicated into the attached fuel cell system.

Figure 5:
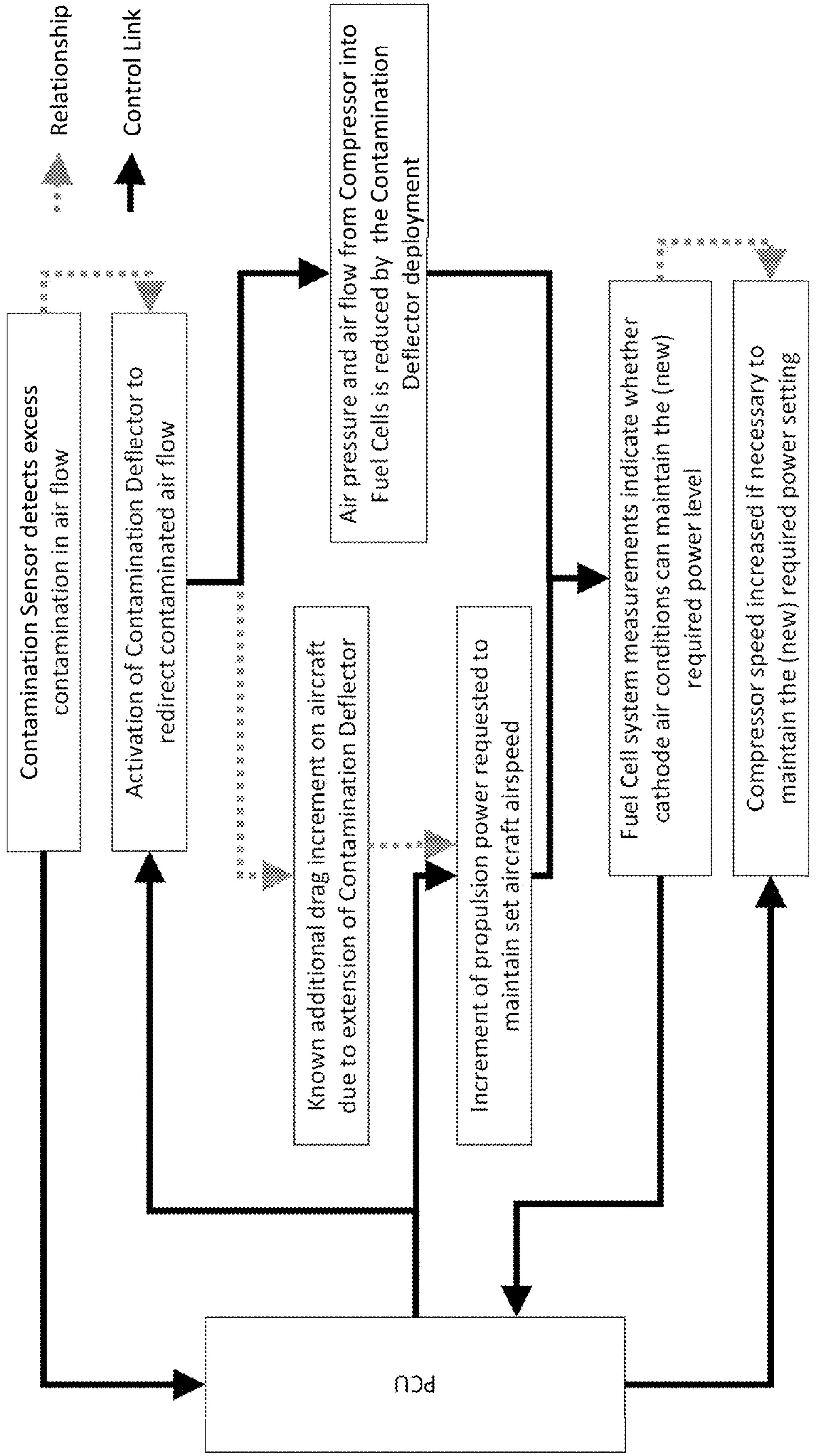
FIG. 5 illustrates the control logic of operation of the system.

FIG. 5 describes the logic of the preferred embodiment of the invention where the aircraft speed of the aircraft the invention is fitted to is maintained constant throughout the deployment of the anti-contamination system. The logic is particularly designed to mitigate the impacts of the deployment of the contamination deflector 16, and later its retraction when it is no longer needed to be deployed. In this logic when the contamination sensor 13 detects that excessive contaminants are present in the free air flow the signal will be picked up and processed by the PCU 14. The PCU 14 in response to this signal will then trigger the deployment of the contamination deflector 16 which, due to its deployment, will alter the air flow around the aircraft and into the air intake 10.

In its deployed state the contamination deflector 16 will add a known drag increment to the aircraft, and hence the PCU 14 will also increase the set power level required from the fuel cells 12 to increase the propulsive thrust to the aircraft to thereby maintain the aircraft's airspeed at a constant level. The deployment of the contamination deflector 16 will also cause a known a reduction in the air pressure and reduction in air flow through the compressor 11 into the fuel cells 12. In some circumstances the stoichiometric ratio and pressure drop may be such that an insufficient air flow is provided to the fuel cells 12 to achieve the new set power level. The PCU 14 would therefore in this instance also increase the speed of the compressor 11 to raise the air pressure and increase the flow of air into the cathodes of the fuel cells 12 to enable the new power setting. In this case the PCU 14 may also take feedback from existing sensors on the fuel cell system, such as air mass flow and generated voltages which would allow the PCU 14 to adjust the inputs to the compressor 11 and fuel cells 12 due to any variations due to state of degradation of the fuel cell 12 or similar.

At the point that the contamination sensor 13 indicates that the level of contaminants in the air flow fall below the designated acceptable level, then the PCU 14 will trigger the actuator 15 to retract the contamination deflector 16 and will reverse any power setting changes and changes in the compressor 11 speed made to account for the return of the standard flow into the air intake 10, thereby once again maintaining the aircraft speed constant.

Figure 6:
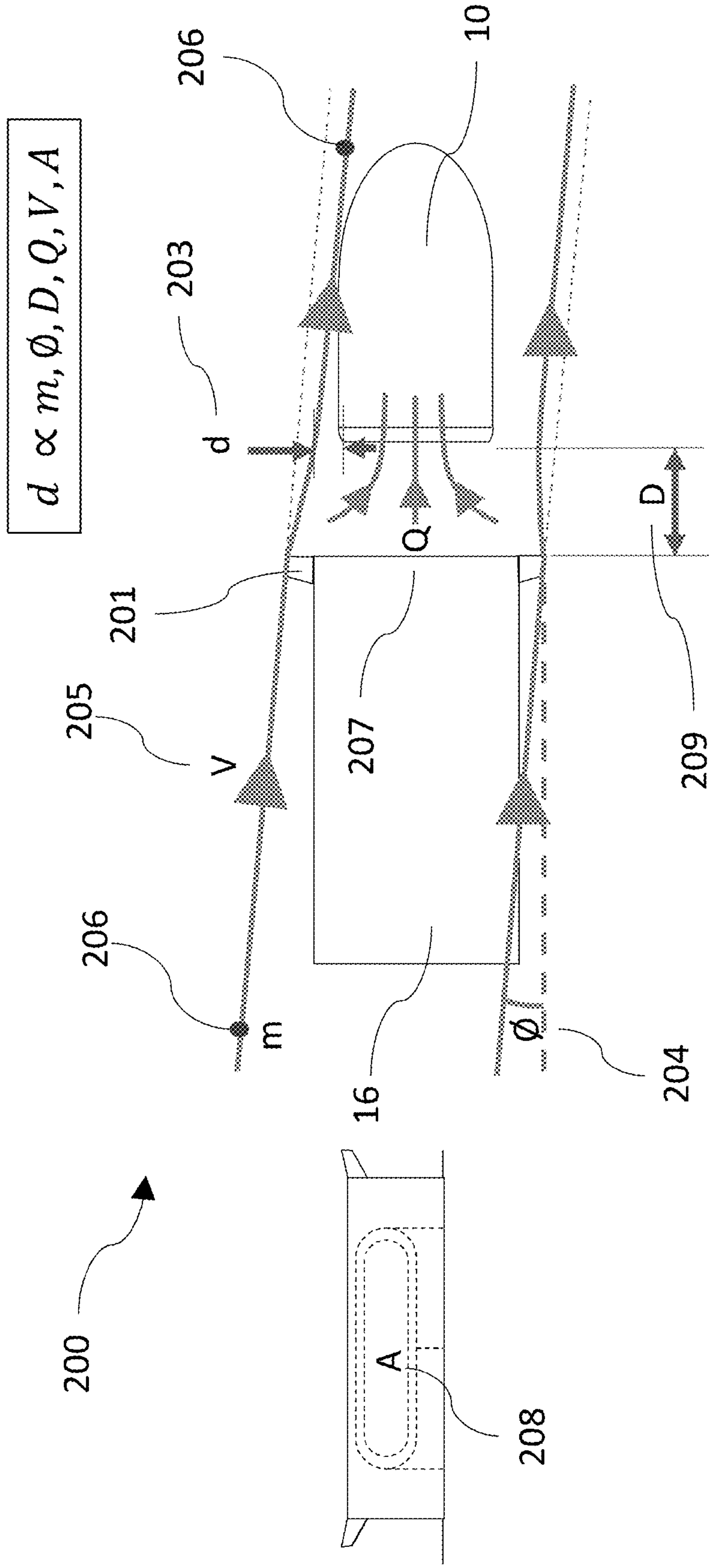
FIG. 6 illustrates the relationships of the contamination mass, air flow, aircraft attitude, deflector size and position and intake flows.

FIG. 6 highlights some of the key relationships to ensure that the contamination deflector 16 and any aerodynamic features 201 are correctly sized in relation to the aircraft application and the air intake 10. The objective is to ensure that there is a clearance distance d 203 between the air intake 10 and the path of any contamination from a contamination mass m 206 that is above a mass level determined that could be detrimental to the compressor 11 and fuel cell 12 system. FIG. 6 highlights that whether this clearance distance d 203 is positive and therefore 'safe' for the system is proportional to the velocity V 205 of the free air flow, which will have a direct relationship to: the velocity of the aircraft, the attitude angle Ø 204 of the free air flow in relation to the contamination deflector 16 and air intake 10, the contamination mass m 206, the suction inflow Q 207 into the air intake 10 and compressor 11, the air intake throat area A 208 and the gap distance D 209 between the contamination deflector 16 and the air intake 10. As can be seen in FIG. 6 it can be expected that there will be both an angling of the flow closer to the air intake 10 due to the attitude angle Ø 204, but also neck down of the flow path towards the air intake 10 due to the suction inflow Q 207. The amount of neck down flow path deviation being proportional to a combination of the velocity V 205, the air intake area A 208 and the suction inflow Q 207.

The application of the proportionality relationship will need to consider a full range of suction inflow Q 207, which could include a ramp up to full power at low aircraft speed for instance during an aircraft go-around action. This may require the air intake throat area A 208 to be increased, and/or the width and height of the contamination deflector 16 to be increased to avoid contaminated air entering the air intake 10.

The attitude angle Ø 204 of the free air flow should consider both transient and steady condition changes, a transient condition for example being a rapid pitch up or down of the aircraft, whereas the deployment of the aircraft's flaps causing an attitude change would represent a steady condition to be considered. The free air velocity V 205 would typically be the aircraft's velocity through the air, plus any local aerodynamic effects, and will normally be most challenging for the anti-contamination system and contamination deflector 16 sizing at low aircraft speed. The contamination mass m 206 target level should be set considering both the effect of an individual piece of contamination on the fuel cells 12, and multiple instances of the contamination mass m 206 occurring concurrently, in which case the effect of the density of the contamination should be accounted for in the target setting and in the sizing of the contamination deflector 16 and air intake 10.

What is claimed is:

1. An aircraft air intake channel anti-contamination system, comprising:

an air intake channel having an inlet at an external surface of the aircraft, the air intake channel being configured to deliver air from an air flow around the aircraft to a fuel cell of the aircraft;

a sensor configured to detect contaminants in the air flow;

a contaminant deflector deployable from a retracted position to a deployed position in which it disrupts the air flow to thereby deflect contaminants away from or out of the air intake channel;

an actuator configured to deploy and retract the contaminant deflector; and a controller operatively connected to the actuator, to the sensor, to the fuel cell, and to a compressor that provides air to the fuel cell, wherein the controller is programmed, during all aircraft operational phases including taxiing, take-off, landing, and flight, to move the contaminant deflector to the deployed position in response to detection by the sensor of contaminants in the air flow, and to retract the contaminant deflector to the retracted position in response to the detected contaminants falling below a predetermined level, wherein the controller is further programmed to adjust a power setting of the fuel cell in response to deployment and retraction of the contaminant deflector, and further based on a voltage generated by the fuel cell, wherein the sensor is mounted on the external surface of the aircraft at a location where the air flow is substantially unaffected by deployment of the contaminant deflector, wherein the contaminant deflector is positioned upstream of the inlet of the air intake channel and directs the air flow outwardly away from the external surface of the aircraft when in the deployed position or wherein the contaminant deflector is positioned within the air intake channel and diverts the air entering the inlet to a secondary outlet at the external surface of the aircraft when in the deployed position.

2. The aircraft air intake channel anti-contamination system according to claim 1, wherein the air intake channel is configured to deliver air from the air flow to a compressor of the fuel cell of the aircraft, and wherein the controller is programmed to increase a speed of the compressor in response to deployment of the contaminant deflector to the deployed position to increase an overall power of the fuel cell of the aircraft and compensate for increased drag caused by the contaminant deflector being in the deployed position.

3. The aircraft air intake channel anti-contamination system according to claim 1, wherein the controller is programmed to increase a set power output level of the fuel cell in response to deployment of the contaminant deflector to the deployed position and thereby compensate for increased drag caused by the contaminant deflector being in the deployed position.

4. The aircraft air intake channel anti-contamination system according to claim 3, wherein the air intake channel is configured to deliver air from the air flow to a compressor of the fuel cell, and the controller is programmed to control a speed of the compressor in response to the set power output level of the fuel cell.

5. The aircraft air intake channel anti-contamination system according to claim 1, wherein the contaminant deflector is sprung loaded biased to the deployed position and thereby protects the fuel cell of the aircraft from the contaminants, and wherein the actuator provides a closing force to retract the contaminant deflector.

6. The aircraft air intake channel anti-contamination system according to claim 5, wherein the sensor includes an infrared emitter and an infrared receiver, the infrared receiver being configured to detect infrared radiation that has been emitted by the infrared emitter and reflected by airborne contaminants, and wherein the sensor is arranged in a free air flow around the aircraft.

7. The aircraft air intake channel anti-contamination system according to claim 1, comprising one or more vortex-generating devices at one or more outer edges of the contaminant deflector.

8. The aircraft air intake channel anti-contamination system according to claim 1, wherein the air intake channel is configured to deliver air from the air flow to the fuel cell of the aircraft via an intake air flow, and in the deployed position the contaminant deflector is configured to either:

(i) disrupt the air flow to thereby deflect contaminants in the air flow away from the air intake channel; or (ii) disrupt the intake air flow to thereby deflect contaminants out of the air intake channel.

9. The aircraft air intake channel anti-contamination system according to claim 1, wherein in the deployed position the contaminant deflector projects outwardly from the external surface of the aircraft upstream of the air intake channel into the air flow across the external surface, to thereby disrupt the air flow and deflect contaminants in the air flow away from the air intake channel.

10. The aircraft air intake channel anti-contamination system according to claim 9, wherein in the retracted position the contaminant deflector is integrated into the external surface of the aircraft.

11. The aircraft air intake channel anti-contamination system according to claim 1, wherein the air intake channel is configured to deliver air from the air flow to the fuel cell of the aircraft via an intake air flow, and in the deployed position the contaminant deflector obstructs the air intake channel to define a secondary outlet channel via which the intake air flow is diverted to a secondary outlet at an external surface of the aircraft.

12. The aircraft air intake channel anti-contamination system according to claim 11, wherein in the deployed position the contaminant deflector defines a secondary intake channel having a secondary air inlet, the secondary intake channel being configured to deliver a secondary intake air flow from the secondary air inlet to the fuel cell.

13. The aircraft air intake channel anti-contamination system according to claim 1, wherein in the deployed position the contaminant deflector projects outwardly beyond the external surface of the aircraft.

14. The aircraft air intake channel anti-contamination system according to claim 1, wherein the contaminant deflector is positioned within the air intake channel and diverts the air entering the inlet to the secondary outlet at the external surface of the of the aircraft when in the deployed position, and wherein in the deployed position the contaminant deflector defines a secondary intake channel having a secondary air inlet downstream of the secondary outlet, the secondary intake channel being configured to deliver a secondary intake air flow from the secondary air inlet to the fuel cell.

15. An aircraft comprising a fuel cell, an external surface, an air intake channel in fluid communication with the external surface and the fuel cell, a compressor that provides air to the fuel cell, and an aircraft air intake channel anti-contamination system configured to protect the air intake channel from airborne contaminants in an air flow around the aircraft, the air intake channel being configured to deliver air from the air flow to the fuel cell, and the system including:

a sensor configured to detect contaminants in the air flow;

a contaminant deflector deployable from a retracted position to a deployed position in which it disrupts the air flow to thereby deflect contaminants away from or out of the air intake channel;

an actuator configured to deploy and retract the contaminant deflector; and a controller operatively connected to the actuator, to the sensor, to the fuel cell, and to the compressor, wherein the controller is programmed to move the contaminant deflector to the deployed position in response to detection by the sensor of contaminants in the air flow, and to retract the contaminant deflector to the retracted position in response to the detected contaminants falling below a predetermined level, wherein the controller is further programmed to adjust a power setting of the fuel cell in response to deployment and retraction of the contaminant deflector, and further based on a voltage generated by the fuel cell, wherein the aircraft air intake channel anti-contamination system is configured to operate during all aircraft operational phases, including taxiing, take-off, landing, and flight, wherein the sensor is mounted on the external surface of the aircraft at a location where the air flow is substantially unaffected by deployment of the contaminant deflector, wherein either:

the contaminant deflector is positioned upstream of an inlet of the air intake channel and directs the air flow outwardly away from the external surface of the aircraft when in the deployed position or the contaminant deflector is positioned within the air intake channel and diverts the air entering the inlet to a secondary outlet at the external surface of the aircraft when in the deployed position.

16. The aircraft as claimed in claim 15, wherein the air intake channel comprises an inlet at the external surface of the aircraft and directs the air flow from the inlet to the compressor configured to provide compressed air to the fuel cell.

17. The aircraft as claimed in claim 15, wherein the contaminant deflector is positioned upstream of the inlet of the air intake channel and directs the air flow outwardly away from the external surface of the aircraft when in the deployed position.

18. The aircraft as claimed in claim 17, wherein the contaminant deflector comprises an impingement surface which, in use, the air flow impinges against in the deployed position and wherein in the deployed position the impingement surface is arranged at an angle to the external surface of the aircraft to thereby urge the air flow away from the external surface and, in the retracted position the impingement surface is generally aligned with, or contiguous with, the external surface.

19. The aircraft as claimed in claim 15, wherein the contaminant deflector is within the air intake channel and diverts the air entering the inlet to the secondary outlet at the external surface of the aircraft when in the deployed position.

20. A method of protecting an air intake channel of an aircraft from airborne contaminants in an air flow using an anti-contamination system, the aircraft comprising a fuel cell, an external surface, and a compressor that provides air to the fuel cell, the air intake channel having an inlet at the external surface and being configured to deliver air from the air flow around the aircraft to the fuel cell, the anti-contamination system comprising a sensor configured to detect contaminants in the air flow, a contaminant deflector deployable from a retracted position to a deployed position in which it disrupts the air flow to thereby deflect contaminants away from or out of the air intake channel, an actuator configured to deploy and retract the contaminant deflector, and a controller operatively connected to the actuator, to the sensor, to the fuel cell, and to the compressor, the method including the steps of:

by the controller, responding to detection of contaminants in the air flow by the sensor by deploying the contaminant deflector to the deployed position during all aircraft operational phases, including taxiing, take-off, landing, and flight;

by the controller, retracting the contaminant deflector to the retracted position in response to the detected contaminants falling below a predetermined level; and by the controller, adjusting a power setting of the fuel cell in response to deployment and retraction of the contaminant deflector, and further based on a voltage generated by the fuel cell, wherein the sensor is mounted on the external surface of the aircraft at a location where the air flow is substantially unaffected by deployment of the contaminant deflector, and wherein either:

the contaminant deflector is positioned upstream of the inlet of the air intake channel and directs the air flow outwardly away from the external surface of the aircraft when in the deployed position, or the contaminant deflector is positioned within the air intake channel and diverts the air entering the inlet to a secondary outlet at the external surface of the aircraft when in the deployed position.

* * * * *